(12) United States Patent
Diller et al.

(10) Patent No.: US 6,385,903 B1
(45) Date of Patent: May 14, 2002

(54) PLUG TRAY

(75) Inventors: Calvin K. Diller; Mark S. Lercel, both of East Jordan, MI (US)

(73) Assignee: East Jordan Plastics, Inc., East Jordan, MI (US)

(*) Notice: Subject to any disclaimer, the term of this patent is extended or adjusted under 35 U.S.C. 154(b) by 0 days.

(21) Appl. No.: 09/577,291

(22) Filed: May 23, 2000

Related U.S. Application Data

(60) Provisional application No. 60/150,457, filed on Aug. 24, 1999.

(51) Int. Cl.$^7$ .................................................. A01G 9/02
(52) U.S. Cl. ........................................................ 47/66.5
(58) Field of Search ................................ 47/66.1, 66.5, 47/73, 77, 85, 86

(56) References Cited

U.S. PATENT DOCUMENTS

| | | | |
|---|---|---|---|
| 3,035,369 A | | 5/1962 | Helfert |
| 3,164,507 A | | 1/1965 | Masuda |
| 3,310,218 A | * | 3/1967 | Reifers et al. ............ 206/521.1 |
| 3,810,329 A | | 5/1974 | Lecuru e al. |
| 3,949,523 A | | 4/1976 | Lehtipuu |
| 3,986,299 A | | 10/1976 | Merzweiler .................... 47/37 |
| 4,050,188 A | | 9/1977 | Van Wingerden |
| 4,221,175 A | | 9/1980 | Van Wingerden et al. |
| 4,242,834 A | | 1/1981 | Olsen |
| 4,389,814 A | | 6/1983 | Andreason et al. |
| 4,453,344 A | | 6/1984 | Van Wingerden |
| D277,837 S | | 3/1985 | Turunen |
| 4,510,712 A | | 4/1985 | Whitcomb |
| 4,597,222 A | | 7/1986 | Roode |
| 4,658,542 A | * | 4/1987 | Holmberg ...................... 47/86 |
| 4,671,699 A | | 6/1987 | Roach |
| 4,753,037 A | | 6/1988 | Whitcomb |
| 4,771,912 A | | 9/1988 | Van Wingerden |
| 4,777,764 A | | 10/1988 | Van Wingerden |
| RE32,808 E | | 12/1988 | Wingerden |
| D298,924 S | | 12/1988 | Saarinen |
| 4,854,075 A | | 8/1989 | Greiling |
| 4,926,587 A | | 5/1990 | Van Wingerden |
| D324,834 S | | 3/1992 | Saarinen |
| D325,714 S | | 4/1992 | Karhiniemi et al. |
| 5,131,185 A | | 7/1992 | Wingerden |
| 5,315,786 A | | 5/1994 | Smith et al. |
| 5,365,693 A | | 11/1994 | Van Wingerden et al. |
| 5,426,890 A | | 6/1995 | Dummen |
| D381,933 S | | 8/1997 | Van Wingerden |
| 5,678,356 A | | 10/1997 | Van Wingerden |
| 6,050,027 A | | 4/2000 | Pavelka et al. ................. 47/84 |
| 6,125,577 A | | 10/2000 | Merzweiler et al. ........... 47/39 |
| 6,125,579 A | | 10/2000 | Pavelka ......................... 47/79 |
| 6,134,832 A | | 10/2000 | Bokmiller et al. ........... 47/66.1 |

\* cited by examiner

*Primary Examiner*—Charles T. Jordan
*Assistant Examiner*—Son T. Nguyen
(74) *Attorney, Agent, or Firm*—Van Dyke, Gardner, Linn & Burkhardt, LLP

(57) ABSTRACT

A plug tray for growing, planting and transplanting plants includes a surface member having a plurality of rows of inner cells and a pair of rows of outer cells. Each row of outer cells is positioned proximate to an end of the surface member. A plurality of aeration apertures are formed in the surface member to thereby provide aeration to plants growing within the cells. The inner cells and outer cells are offset with respect to the major axis of the surface member to thereby provide increased strength and rigidity, allowing the tray to be manufactured using the relatively inexpensive process of thermoforming. The outer cells are configured such that the center-to-center distance between adjacent outer cells of a pair of plug trays placed end-to-end is substantially equal to the center-to-center distance between adjacent cells within a particular plug tray. The uniform center-to-center distance between outer cells of adjacent plug trays permits the plug tray to be used in a continuous automated process for planting and transplanting purpose. In an alternative preferred embodiment, a plug tray includes a plurality of rows of inner cells and a pair of rows of outer cells. Each inner cell and outer cell has four top edges, each of which is parallel to the opposing ends or opposing sides of the tray. Each outer cell is slightly smaller than each inner cell such that the center-to-center distance between adjacent plug trays is maintained.

39 Claims, 8 Drawing Sheets

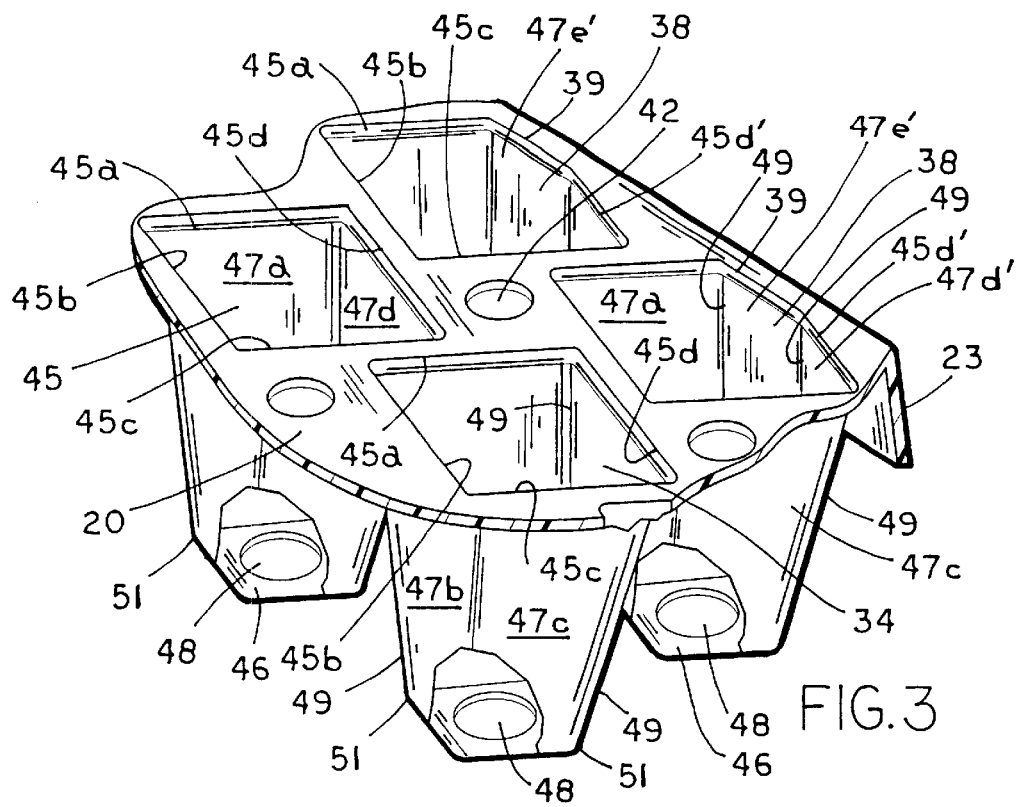
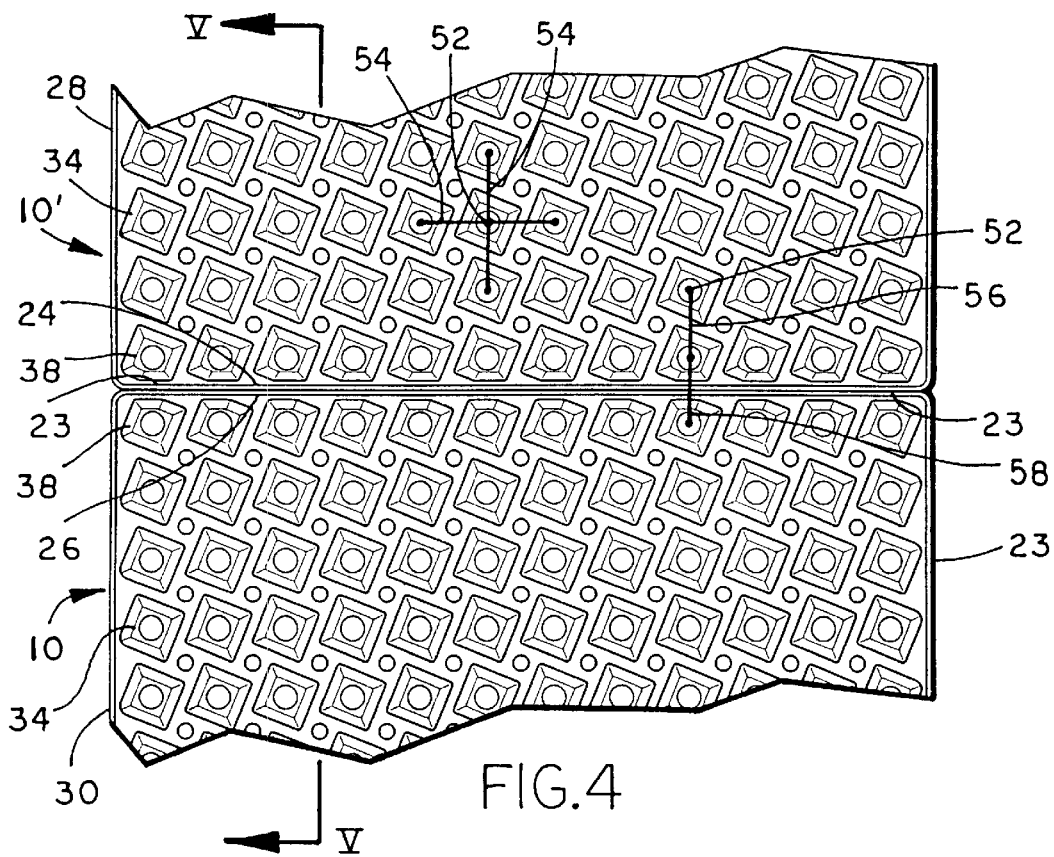

PLUG TRAY

CROSS REFERENCE TO RELATED APPLICATIONS

This Application claims priority from U.S. Provisional Application, Seral No. 60/150,457, filed Aug. 24, 1999, the disclosure of which is hereby incorporated herein by reference.

BACKGROUND OF THE INVENTION

The present invention relates generally to devices used in the propagation of plants, and in particular to a device for use in germinating and growing plants.

In the horticultural industry, it is common practice to germinate seedlings or cultivate young plants in containers or trays having a plurality of like sized cavities or cells, each of which is dimensioned to receive a charge of plant growing material, such as peat moss, soil and the like, and one or more seeds or young plants. These trays, commonly referred to as "plug trays" within the industry, normally have the cells arranged in a closely packed, uniform spatial array such that a maximum number of plants may be grown within each tray. Once the seeds or young plants and the material necessary for growth are positioned within the cells, the plug tray is positioned in a designated area and exposed to environmental conditions necessary for expedient plant growth. Once the plants within the plug tray cells achieve a certain amount of growth, or have been positioned within the plug tray for a preselected period of time, the plants are removed from the plug tray and transplanted into larger containers.

Normally, both the placement of the seeds and growing material within the cells, and the transplantation of plants from the plug tray into larger containers, is accomplished by an automated process. In this automated process, the plug trays are placed in a contiguous end-to-end relationship along a conveying surface. The plug trays are filled with growing media as they move on a conveyor. An automated device, positioned above the plug trays, deposits one or more seeds into the cells, or removes the plants together with the "root plug" or "root system" contained within each cell and deposits the same in a larger container. The automated device is positioned overhead of the plug trays and is formed having a plurality of laterally extending fingers or guides which are moved into position below the top surface of the plug tray, and between the cells. These lateral guides align the plug tray below the automated device. The automated device is calibrated to descend upon a particular cell or cells within the plug tray based upon the center-to-enter distance between adjacent cells. Consequently, it is critical for the effective and efficient operation of this automated process that the center-to-center distances between adjacent cells of the plug trays is maintained.

In the past, it has been common practice to use a single plug tray in the deposition and transplantation processes. However, when using multiple plug trays, a difficulty encountered by the industry is the ineffective deposition into, and transplantation from, a series of plug trays due to the non-uniformity in the center-to-center distance between cells of adjacent plug trays. That is, at the intersection between two adjacent plug trays, the center-to-center distance between the cells of the last row of one plug tray and the first row of the second plug tray are not equal to the center-to-center distance between the remainder of the cells composing a particular plug tray. Consequently, when the automated device descends upon the first row of cells of a second plug tray, the automated device often fails to adequately align with the center of the cell. This lack of centering between the automated device and the cells of a plug tray results in the failure to deposit the seed within the cell, or in the case of transplantation, to adequately grasp the entirety of the plant and its root system. This in turn causes ineffective filling of the plug tray cells, and when transplanting, increases the likelihood of damage to the plants and/or plug tray, and reduces the efficiency of the transplantation process. Furthermore, the inefficiencies caused by non-uniform center-to-center distances between plug trays will continue until the automated device is shut down and the plug trays are repositioned.

Heretofore, the use of multiple plug trays in the automated processes previously described has required the plug trays to have vertical exterior walls in order to maintain a uniform distance between the cells of adjacent plug trays. Additionally, some plug trays are designed and manufactured to be reusable. One method commonly used to form a reusable plug tray having vertical exterior walls is injection molding. Injection molding is a relatively expensive molding process, and hence increases the manufacturing costs and can add complications to the plug growing process.

Reusing plug trays presents additional problems within the industry. Specifically, reusing plug trays exposes the second or successive batch of plants to potential disease from the previous plant batch. Thus, in many instances, to prevent transmission of plant diseases, the reusable plug trays are cleaned before accepting another batch of seed. Cleaning the plug trays is a cumbersome procedure which increases the complexity and costs of the plant cultivation procedure. Specifically, cleaning the plug trays requires the purchase of a relatively expensive cleaning/sterilizing apparatus.

Accordingly, there exists a need within the industry for a plug tray which overcomes the difficulties of the prior art by providing a uniform center-to-center distance between the cells of adjacent plug trays, which is sufficiently economical to manufacture so as to avoid the need for reuse, is recyclable, and exhibits the requisite strength and rigidity for both singular tray or multiple tray use, and especially with automated processes.

SUMMARY OF THE INVENTION

The present invention provides a plug tray having increased strength and rigidity which may be manufactured using the relatively inexpensive thermoforming process. By employing the thermoforming process, it becomes economically feasible to use the plug tray of the present invention in the cultivation of a single batch of seeds or young plants, whereafter the plug tray may be recycled. Providing an economical, single use plug tray reduces the potential for disease in successive batches of plants and eliminates the need to clean the plug tray subsequent to transplantation. Furthermore, the plug tray of present invention is configured having a uniform center-to-center distance between the cells of adjacent plug trays, which in turn maximizes the efficiency of the automated planting and transplantation processes.

According to an aspect of the invention, a plug tray for growing plants includes a surface member having formed in or therethrough a plurality of rows of inner cavities or cells, and a pair of rows of outer cells with each row of outer cells adjacent to an end of the surface member. Each cell is dimensioned to accept a charge of growing material, and at least one seed or young plant. A plurality of apertures are formed in the surface member to thereby provide aeration for plant growth. The apertures are formed in the surface member such that each aperture is separated from the cells by the surface member. Each inner and outer cell is at a preselected offset angle with respect to the major axis of the surface member. Offsetting the cells at a preselected angle yields a plug tray having greater strength and rigidity, and thus enables the plug tray to be manufactured using the less expensive method of thermoforming. Further strength is gained by forming the apertures such that the surface member surrounds the apertures and separates the same from the cells. Additionally, off-setting the cells at a preselected angle provides a centering effect which aids in the alignment of the plug trays during the automated deposition and transplantation processes. Due to the off-set angle, the lateral guides of the automated device extending below the top surface of the plug tray have less clearance between adjacent rows of cells, and thereby enables the lateral guides to achieve greater precision in aligning the plug trays.

In a preferred embodiment, the plurality of apertures are positioned in rows, such that each row of inner cells is bordered by a pair of rows of apertures, while each row of outer cells is bordered by a single row of apertures. Thus, positioned adjacent each aperture are either four inner cells, or two inner cells and two outer cells. In an alternative preferred embodiment, the plurality of apertures are formed in diagonal rows such that each inner cell is adjacent to two apertures, while each outer cell is adjacent to one aperture.

According to another aspect of the invention, a plug tray includes a surface member and a plurality of rows of inner cells formed therein. Each inner cell has a substantially square shape and four sides attached to a bottom member, wherein the bottom member has a hole formed therein such that each side of the four sides is separated from the hole by the bottom member. The surface member is further formed having a plurality of apertures, preferably providing aeration. Proximate to each opposing end of the surface member is a row of outer cells. The outer cells are shaped with a top opening edge proximate to, and generally parallel with, an end of the surface member. The generally parallel top opening edge of each outer cell permits the plug tray of the instant invention to be used in a continuous planting or transplantation operation wherein plug trays are positioned in an adjacent end-to-end arrangement. As the distance between the outer cells of adjacent plug tray is approximately equal to the distance between the inner cells, there is a seamless transition between the plug trays when used in an automated planting and transplantation process. This in turn increases the efficiency of both the planting and transplantation process. Additionally, the substantially square shape of the cells having sides and a bottom member, wherein the hole is formed in the bottom member such that each side is separated from the hole by the bottom member, provides the advantage of supporting the bottom of the root plug, while allowing aeration. The use of a bottom member also permits the cell to have a greater area and thus increases the amount of growing material which may be inserted into each cell, hence maximizing the chances of successful plant growth.

According to still another aspect of the invention, a plug tray includes a pair of opposing ends and a pair of opposing sides, a plurality of rows of inner cells and a pair of rows of outer cells, each of which is adjacent to an end of the opposing ends. Each inner cell and outer cell is formed having four top opening edges, wherein each top opening edge is substantially parallel to either the opposing sides or opposing ends. Each inner cell and outer cell has a first dimension generally parallel to the opposing ends and a second dimension generally parallel to the opposing sides. The first dimension of each inner cell is greater than the first dimension of each outer cell and the second dimension of each inner cell is greater than the second dimension of each outer cell. Providing a plurality of inner cells each of which has a greater size than the outer cells permits the plug tray to be used in automation deposition and transplantation processes because the center-to-center distance between the outer cells of adjacent plug trays is substantially the same as the center-to-center distance between the inner cells of the tray. Furthermore, providing a plug tray having cells with four top opening edges, each of which is substantially parallel to either the opposing sides or opposing ends, enables the maximization of the number of cells within the tray.

According to yet another aspect of the invention, a method of forming a plug tray includes thermoforming a polymer sheet into a plug tray including a surface member having a perimeter defined by a pair of opposing sides, a pair of opposing ends, and having a major axis, and a plurality of rows of cells formed in said surface member. Employing a thermoforming process in the manufacture of plug trays significantly reduces manufacturing costs and thereby enables the plug tray of the present invention to be used in the cultivation of a single batch of plants, and subsequently recycled.

According to still yet another aspect of the invention, a system for growing plants includes a first and second plug tray wherein an end of the first plug tray is positioned in contact with the end of the second plug tray. Each plug tray includes a surface member formed with a plurality of rows of inner cells, apertures and a pair of rows of outer cells. Each outer cell is formed so that the center-to-center distance between the outer cells of the plug trays is substantially equal to the center-to-center distance between adjacent inner cells, to thereby enable the system to be used in conjunction with automated processes.

These and other objects, advantages, purposes and features of the invention will become apparent upon review of the following specification in conjunction with the drawings.

BRIEF DESCRIPTION OF THE DRAWINGS

FIG. 3 is a perspective, partial cutaway view of a pair of inner cells and a pair of outer cells of the plug tray depicted in FIGS. 1 and 2;

FIG. 4 is a partial plan view depicting a first and second plug tray, according to the invention, positioned in an end-to-end arrangement;

DETAILED DESCRIPTION OF THE PREFERRED EMBODIMENTS

Figure 1:
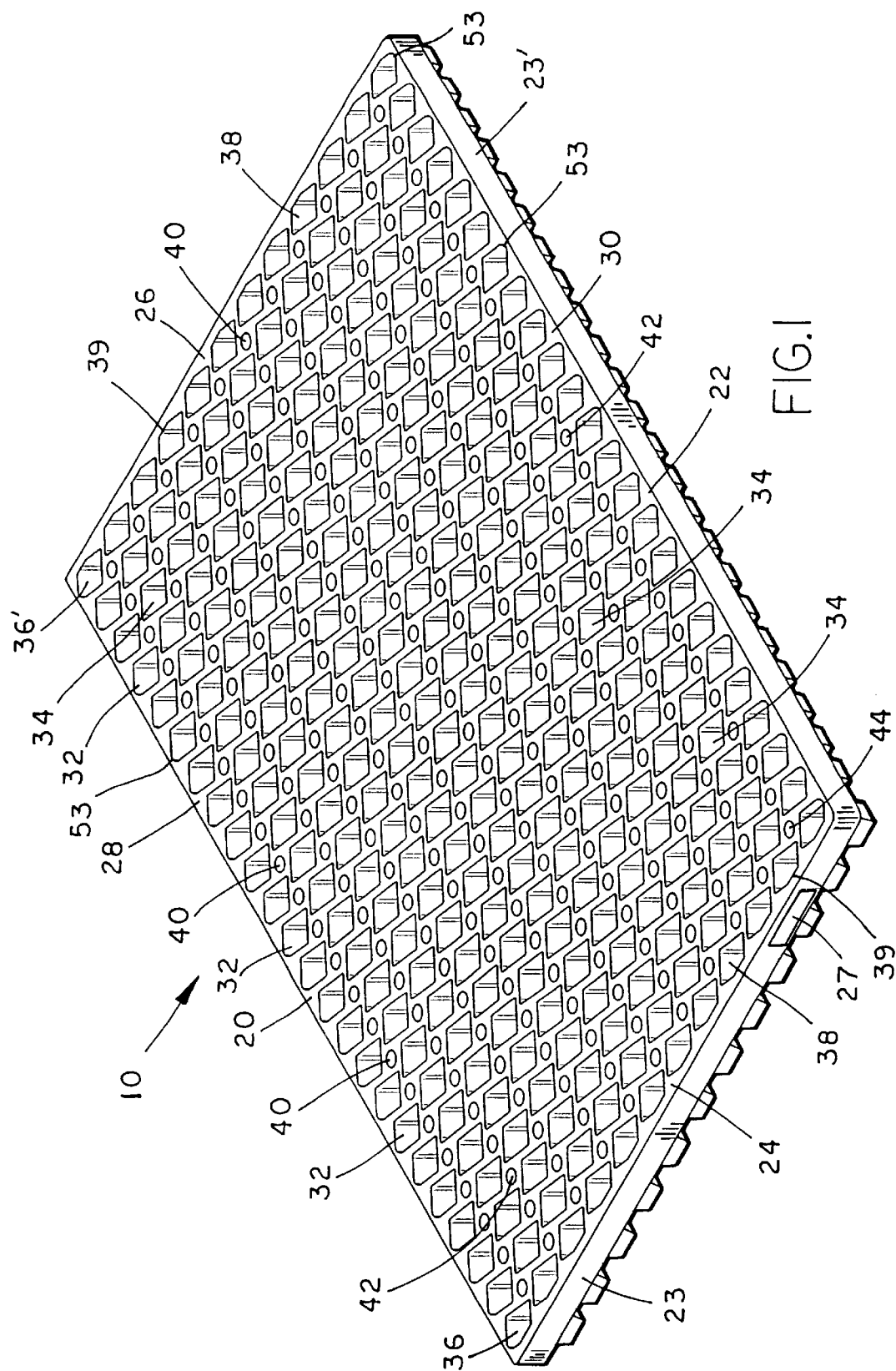
FIG. 1 is a perspective view of a plug tray for growing plants according to the invention.

Referring now specifically to the FIGS. 1 through 6, there is shown a plug tray 10, according to the present invention, for use in germinating and growing plants. Plug tray 10 includes a substantially planar top, or surface member 20. Surface member 20 is generally rectilinear with a periphery 22. Periphery 22 is defined by a pair of opposing ends 24 and 26, and a pair of opposing sides 28 and 30. Surface member 20 is formed with a plurality of rows 32 of inner cavities or cells 34. A pair of rows 36 and 36' of outer cells 38 are provided adjacent to ends 24 and 26, respectively, of surface member 20. Rows 32, 36 and 36' span from side 28 to side 30. Each inner cell 34 and outer cell 38 extends in or through surface member 20, with cells 34, 38 placed and formed in spaced relation, and projecting a preselected distance below surface member 20. Also, each inner cell 34 and outer cell 38 is dimensioned to receive a charge of a preselected amount of growing materials, such as peat moss, potting soil, fertilizer, etc., and a seed or young plant.

Figure 7:
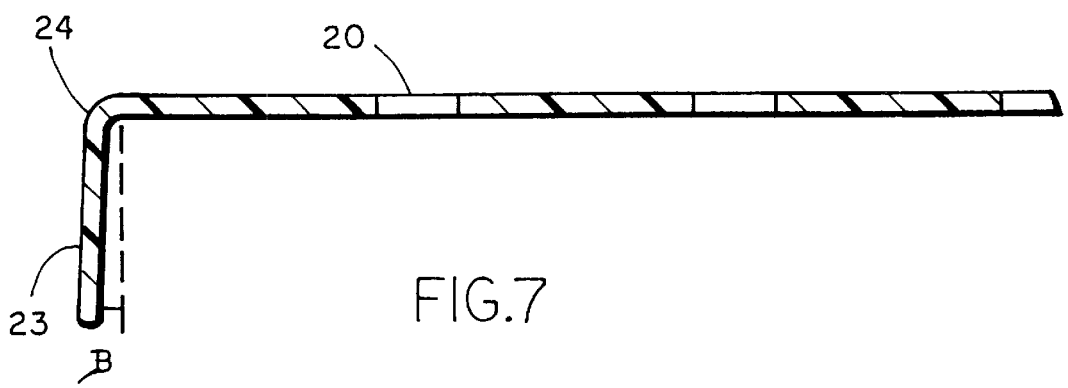
FIG. 7 is a detailed sectional view depicting a skirt depending from an end of the plug tray.
Figure 8:
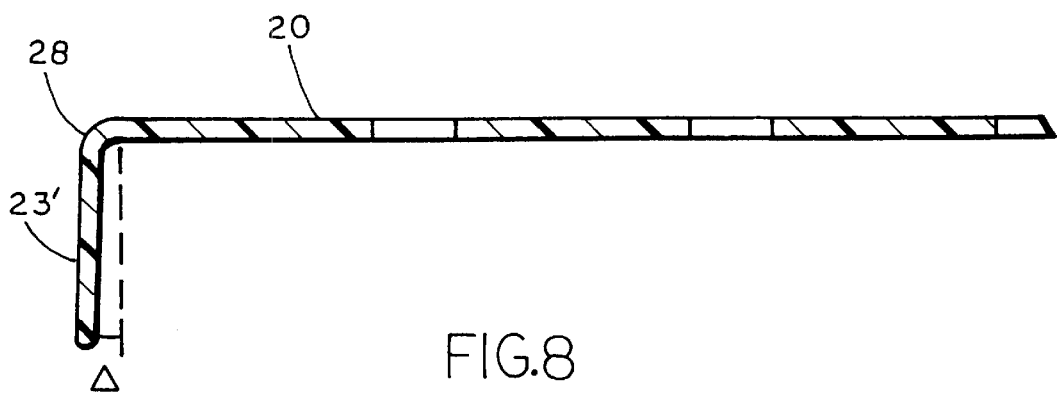
FIG. 8 is a detailed sectional view depicting a skirt depending from a side of the plug tray.

A flange or skirt 23 projects downwardly from opposing ends 24 and 26, and is flared or angled outwardly at a preselected angle β from the vertical (FIG. 7). Preferably angle β is between approximately 2° and 8°. Most preferably, angle β is approximately 3°. A skirt 23' projects downwardly from opposing sides 28 and 30, and is angled outwardly at a preselected angle Δ from the vertical (FIG. 8). Preferably, angle Δ is between approximately 2° and 8°. Most preferably, angle Δ is approximately 5°. The angles of skirt 23, 23' allow stacking of plug tray 10 in a compact configuration for storage and shipping. Also, skirts 23, 23' act as reinforcing members, adding strength and rigidity to plug tray 10. As seen most clearly in FIGS. 1 and 5, the height of skirts 23, 23' is less than the height of inner cells 34 and outer cells 38. Skirts 23, 23' also provide an adequate continuous surface for labeling or identification purposes, which may be accomplished by a legend 27 attached to the exterior surface of skirts 23, 23'. Legend 27 may be any legend commonly utilized in the industry. For example purposes only, legend 27 may be a piece of material having an adhesive backing. The information carried by legend 27, may be any alpha and/or numeric information desired, product identification code, UPC, or the like. For example purposes only, legend 27 may denote the type of plants contained within a particular plug tray 10, and the date on which the plants were deposited.

To provide proper aeration to the plant leaves, surface member 20 is formed with a plurality of rows 40 of aeration apertures 42. Rows 40 of aeration apertures 42 are in alternating arrangement with rows 32 of inner cells 34. Also, a row 40 of aeration apertures 42 is positioned between each row 36 and 36' of outer cells 38 and the adjacent row 32 of inner cells 34. Preferably, aeration apertures 42 are circular in shape. Furthermore, it will be seen that aeration apertures 42 are substantially smaller in size than the area of surface member 20 defined between four adjacent inner cells 34, or two inner cells 34 and two outer cells 38. Each aeration aperture 42 is thus separated and spaced from either the four adjacent cells 34, or inner and outer cells 34 and 38, by surface member 20. The smaller size of aeration apertures 42 provides a peripheral area 44 of surface member 20 between four adjacent cells 34, or 34 and 38, which in turn increases the strength and rigidity of plug tray 10. The smaller the size of apertures 42, the greater strength and rigidity of the resulting plug tray 10.

Each inner cell 34 has a top opening 45 from which a seed or plant will grow. Openings 45 are each generally in the shape of a parallelogram, which is preferably substantially square in shape. Extending downwardly from each side top edge 45a, b, c, or d, of inner cell 34 are generally planar sides 47a, b, c, d, which are joined to one another along corners 49. Outer cells 38 include five planar sides 47a, b, c, d' and e', extending from top opening side edges 45a, b, c, d' and 39 as shown best in FIG. 3. Sides 47a, b, c, d of inner cells 34 and 47a, b, c, d', and e' of outer cells 38 form an integral, continuous, non-interrupted, side wall periphery without any holes or slots. The sides of each inner and outer cell 34, 38 are completely separate from one another such that no side is common with the side of another cell.

Each cell 34, 38 also includes a bottom member 46 joined to each side at bottom corners 51 (FIG. 3). Also, preferably, the sides 47 of inner cells 34 and outer cells 38 each extend downwardly and converge toward one another to provide each cell 34 and 38 with a downwardly tapering configuration with top opening 45 having a greater area than bottom 46. The downwardly tapered configuration of cells 34 and 38 permit plug trays 10 to be stacked in a vertical arrangement to thereby permit facile transportation and storage. Formed in bottom member 46 of each inner cell 34 and outer cell 38 is a bottom aeration hole 48. Bottom aeration hole 48 is formed in bottom member 46 such that sides 47, at bottom corners 51, are separated from bottom aeration hole 48 by bottom member 46. The presence of bottom member 46 increases the stability of each cell, while bottom aeration hole 48 permits aeration of the root plug positioned therein. In addition, bottom member 46 permits each cell 34, 38 to have a greater volume, and thus enables the placement of a larger root plug in order to maximize the chances of effective growth. Except for bottom aeration hole 48, and top opening 45, each cell is completely closed with sides 47, and bottom 46 joined to one another without other openings. Bottom aeration hole 48 enables the root structure within inner cells 34 and outer cells 38 to receive proper aeration necessary for growth, and permits drainage. Outer cells 38 assume a general pentagonal shape, the purpose of which will be described in detail below. Preferably cells 34, 38 adjacent opposing sides 28 and 30, have a slightly arcuate corner 53 (FIG.1), between the side top edges intersecting proximate to opposing sides 28 and 30. The slightly arcuate corner 53 adds strength and rigidity to plug tray 10.

Figure 2:
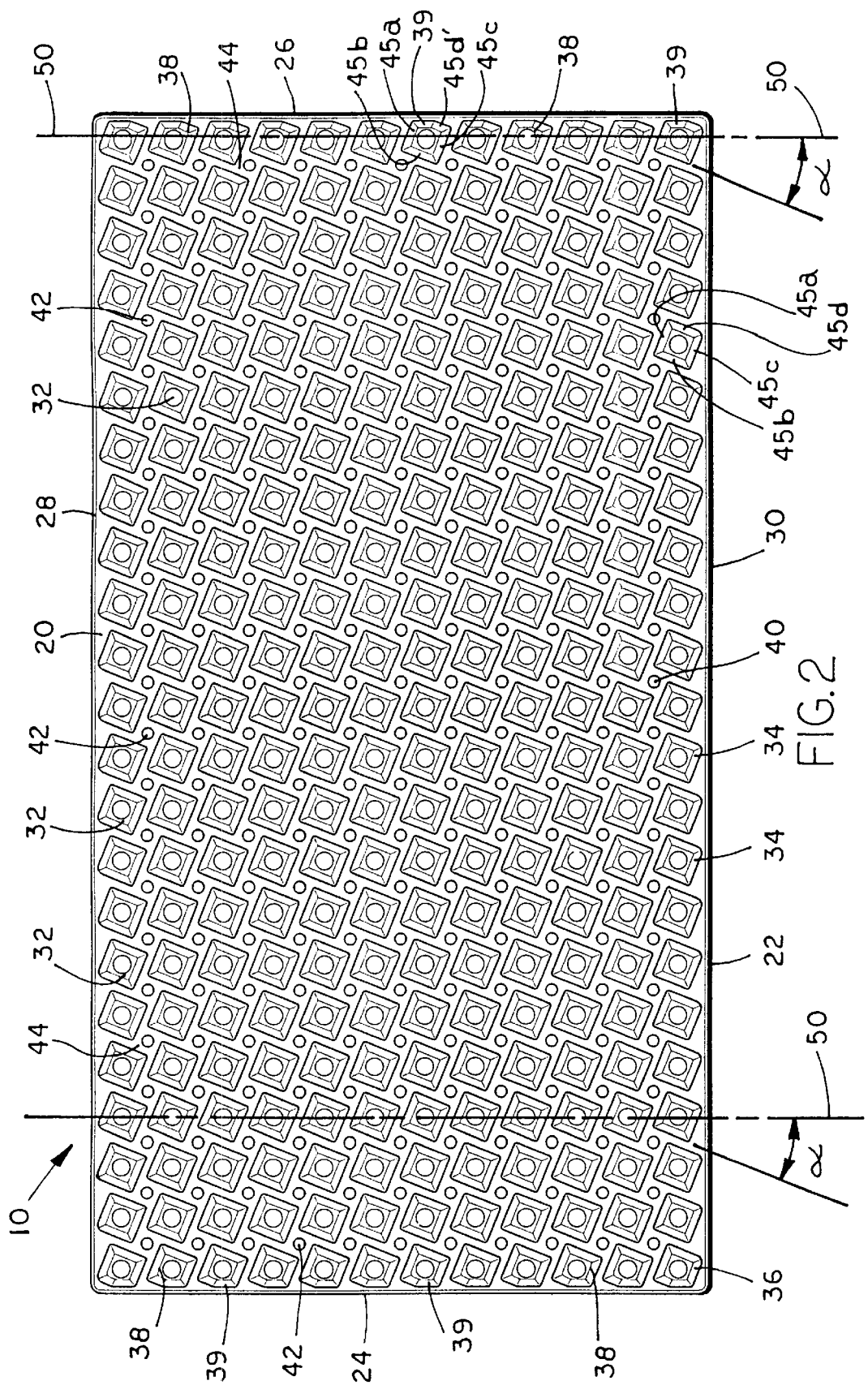
FIG. 2 is a plan view of the plug tray depicted in FIG. 1.

Inner cells 34 and outer cells 38 are offset at an oblique angle with respect to the major axis of plug tray 10. That is, each side top edge 45a through d of inner cells 34, and top side edges 45a, b, c and d' of outer cells 38, define a plane which intersects the planes defined by surface 20 or perimeter 22 at an oblique angle. As shown in FIG. 2, lines 50 represent the major axis of plug tray 10. Angle α is the angle of offset of inner cells 34 and outer cells 38 from major axis 50, and is defined by the angle between major axis 50 which extends through the centers of bottom aeration holes 48, and the plane including one side top edge 45b, 45d or 45d' which would intersect one of opposing sides 28, 30 if extended. The angle α is in the range of between about 15° to 45°. In a preferred embodiment, angle α is about 30°. The offset angle of cells 34 and 38 in surface member 20 provides increased strength and rigidity to plug tray 10, enabling the same to be formed by a relatively inexpensive thermoforming process. Specifically, offsetting inner cells 34 and outer cells 38 to major axis 50, together with skirts 23, 23', increases the resistance of plug tray 10 to bending stress.

Furthermore, offsetting inner cells 34 and outer cells 38 aids in the proper alignment of plug tray 10 by the lateral guides of an automated device used in the deposition and transplantation processes. That is, off-setting inner cells 34 and outer cells 38 results in a reduced distance between adjacent rows of cells, and thus the lateral guides of an automated device which are positioned below surface member 20 of the plug tray 10 have less clearance between adjacent rows of cells 34, 38. This reduced clearance allows the lateral guides to achieve greater precision in the centering of plug trays 10 during the automated processes.

Each inner cell 34 and outer cell 38 has a center represented by point 52 (FIG. 4). The center-to-center distance 54 between each inner cell 34 and the adjacent inner cells 34 lying in a horizontal plane, and measured parallel to either sides 28, 30, or ends 24, 26, is substantially equal. Furthermore, the center-to-center distance 56 between an inner cell 34 and an outer cell 38, measured parallel to sides 28, 30, is approximately equal to the center-to-center distance 54 between two adjacent inner cells 34. The center-to-center distance 58 between outer cells 38 of two adjacent plug trays 10 when skirts 23 are in contact with one another, and when measured perpendicular to ends 24, 26 is, likewise, substantially equal to the distance between inner cells 34. Thus, distances 54, 56, and 58 are substantially equal.

Figure 5:
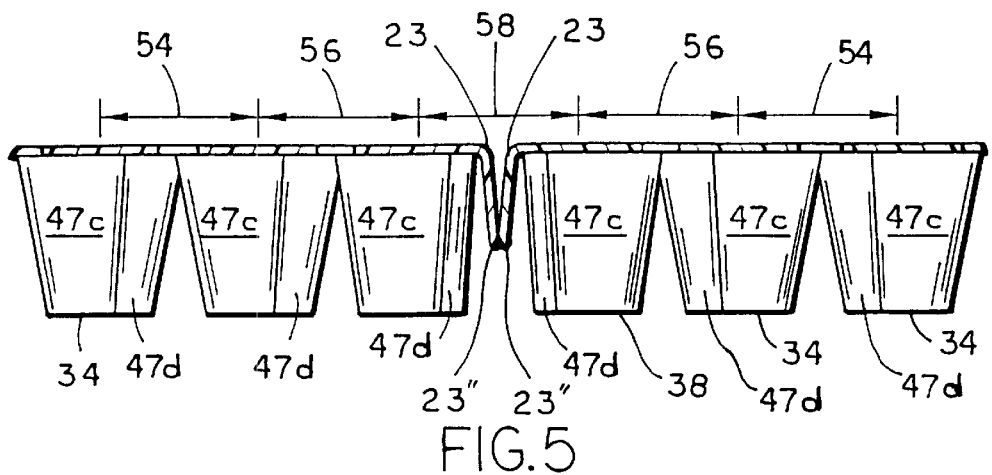
FIG. 5 is a fragmentary, sectional side elevation taken along line V—V of FIG. 4.

In order to permit plug trays 10 to be used in automated planting or transplantation procedures, the center-to-center distance 58 between outer cells 38 of adjacent plug trays 10 and 10' is substantially equal to both center-to-center distances 54 and 56 when skirts 23 are in contact with one another as shown in FIG. 5. In a preferred form, uniformity in the center-to-center distance between adjacent plug trays 10 and 10' is achieved by the generally pentagonal or truncated shape of outer cells 38. Specifically, outer cells 38 are formed such that top opening side edge 39 is proximate to, and substantially parallel with, one of ends 24 or 26 of surface member 20. Consequently, when plug trays 10 and 10' are placed in end-to-end arrangement such that skirt 23 of end 26 of plug tray 10 is in contact with skirt 23 of end 24 of plug tray 10', while sides 28 and 30 of tray 10 and 10' are aligned and approximately co-planar, as shown in FIG. 4, the center-to-center distance 58 between outer cells 38 of plug tray 10 and outer cells 38 of plug tray 10' will be substantially equal to center-to-center distance 54 and 56. It is important to note that when plug trays 10 and 10' are placed in this end-to-end arrangement, bottom edges 23" of skirts 23 will be in contact, but skirts 23 will not be compressed or urged towards outer cells 38. As there is a continuous, uniform distance between particular plug trays 10 when arranged in a end-to-end arrangement, plug tray 10 may be used in continuous automated planting and transplantation processes.

Plug tray 10 may be manufactured in any length and/or width required by the industry. Furthermore, the size of inner cells 34 and outer cells 38 may be manufactured to assume any size. The particular size of cells 34 and 38 is a function of the size of the particular plant which is to be grown in plug tray 10, and the quantity of growing material required for germination and growth. Plug tray 10 may be made of any polymeric sheet material normally utilized in the art of thermoforming. The sheet may have a thickness within the range of 0.025 to 0.075 inches. As used herein, "thermoforming" shall mean the formation of a thermoplastic article by heating a thin, continuous polymeric sheet, and subsequently pulling it onto a mold surface by applying vacuum and pressure to thereby produce the desired shape. Alternatively, vacuum forming methods and/or pressure forming methods as known in the art could also be used. However, thermoforming is preferred because of increased production rates.

Figure 6:
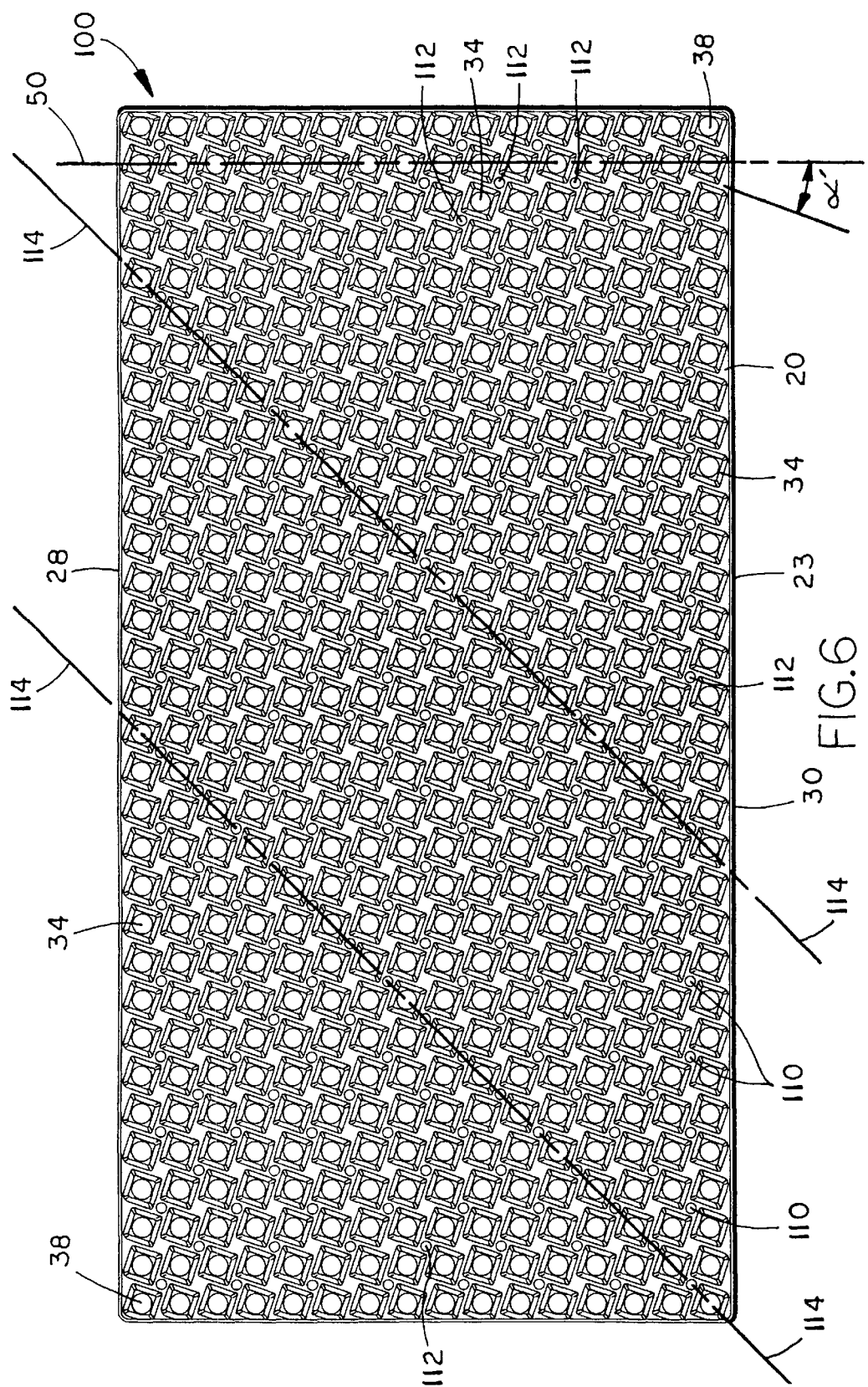
FIG. 6 is a plan view of a plug tray according to alternative preferred embodiment of the invention.
Figure 6A:
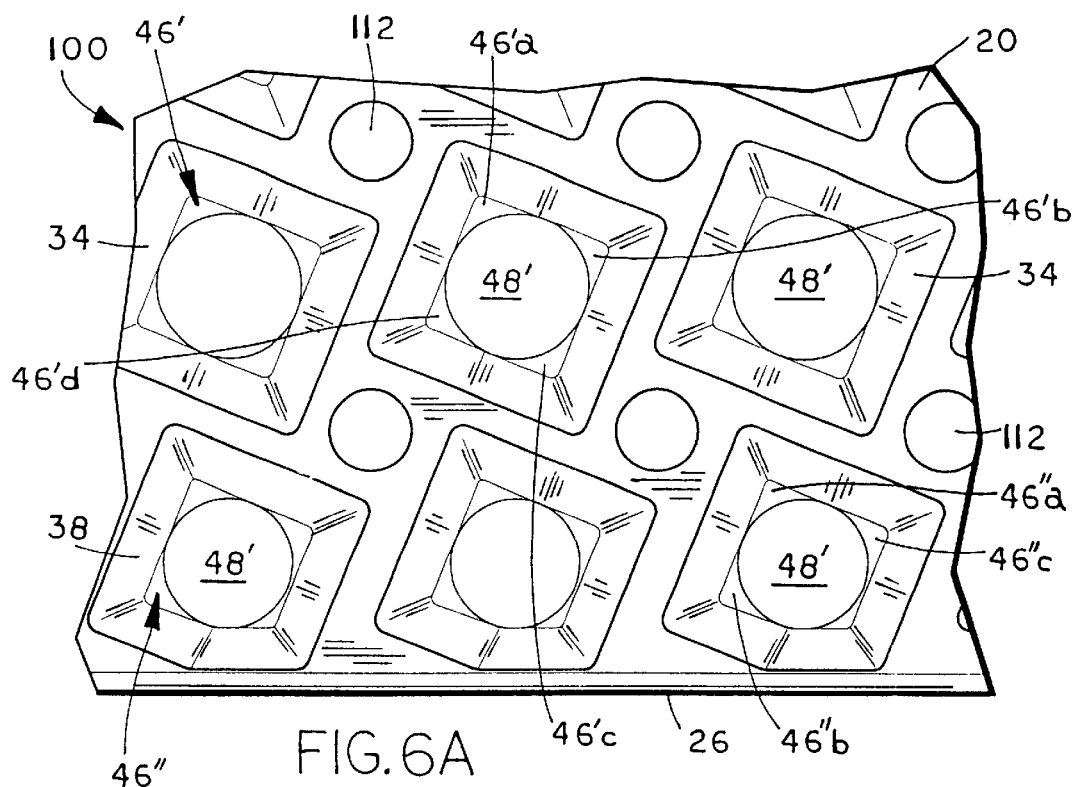
FIG. 6a is a detailed plan view of the plug tray depicted in FIG. 6.

In an alternative preferred embodiment as depicted in FIG. 6, surface member 20 of a plug tray 100 is formed with a plurality of rows 110 of aeration apertures 112. Rows 110 of aeration apertures 112 are diagonal with respect to sides 28 and 30 of plug tray 100. As illustrated in FIG. 6, the configuration of a particular row 110 of aeration apertures 114 is depicted by line 114. Rows 110 of aeration apertures 112 are formed in surface member 20 such that each inner cell 34 is adjacent to two aeration apertures 112, while each outer cell 38 is adjacent to one aeration aperture 112. In this embodiment, the offset angle α' of inner cells 34 and outer cells 38 is between about 15° to 45°, and is preferably about 20°. Also, bottom aeration holes 48' are slightly larger than bottom aeration holes 48. Thus, in this embodiment, inner cells 34 have a bottom member 46' defined by arcuate ledges 46'a, b, c, and d, while outer cells 38 have a bottom member 46" having two arcuate ledges 46" a and b, and surface 46" c, as shown most clearly in FIG. 6a. In all other aspects, plug tray 100 is substantially similar to plug tray 10, and 10'.

To manufacture plug tray 10, 10', or 100, a suitable sheet of polymeric material is first loaded into a thermoforming apparatus. Thereafter, the polymeric sheet is thermoformed in accordance with normal industry procedure, to produce surface member 20, cells 34 and 38 and skirts 23, 23'. Thereafter, aeration apertures 42 are cut by punching into surface member 20 while bottom aeration holes 48 are cut by punching in bottom 46 of cells 34 and 38. Preferably, aeration apertures 42 and bottom aeration holes 48 are simultaneously punched or cut in a single punching operation using a punching tool having a plurality of punch projections corresponding to the number of apertures and holes. Alternatively, multi-step hole forming methods can be used. However, aeration apertures 42 and bottom aeration holes 48 may be formed in plug tray 10, 10' or 100 by any method, using any apparatus normally utilized in the art, capable of cutting a polymeric material. Preferably, aeration apertures 42 and bottom aeration holes 48 are formed in plug tray 10, 10', or 100 by a die cutting apparatus.

Figure 11:
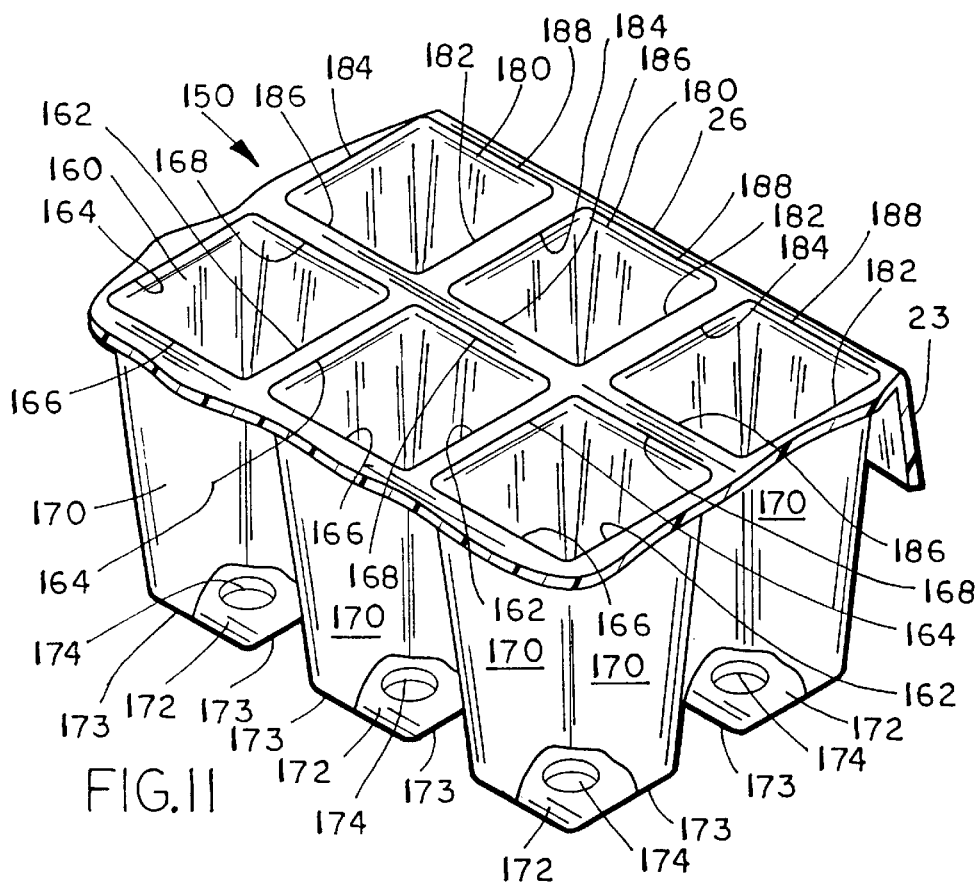
FIG. 11 is a perspective, partial cut-away view of the inner cells and outer cells of the plug tray depicted in FIGS. 9 and 10.
Figure 9:
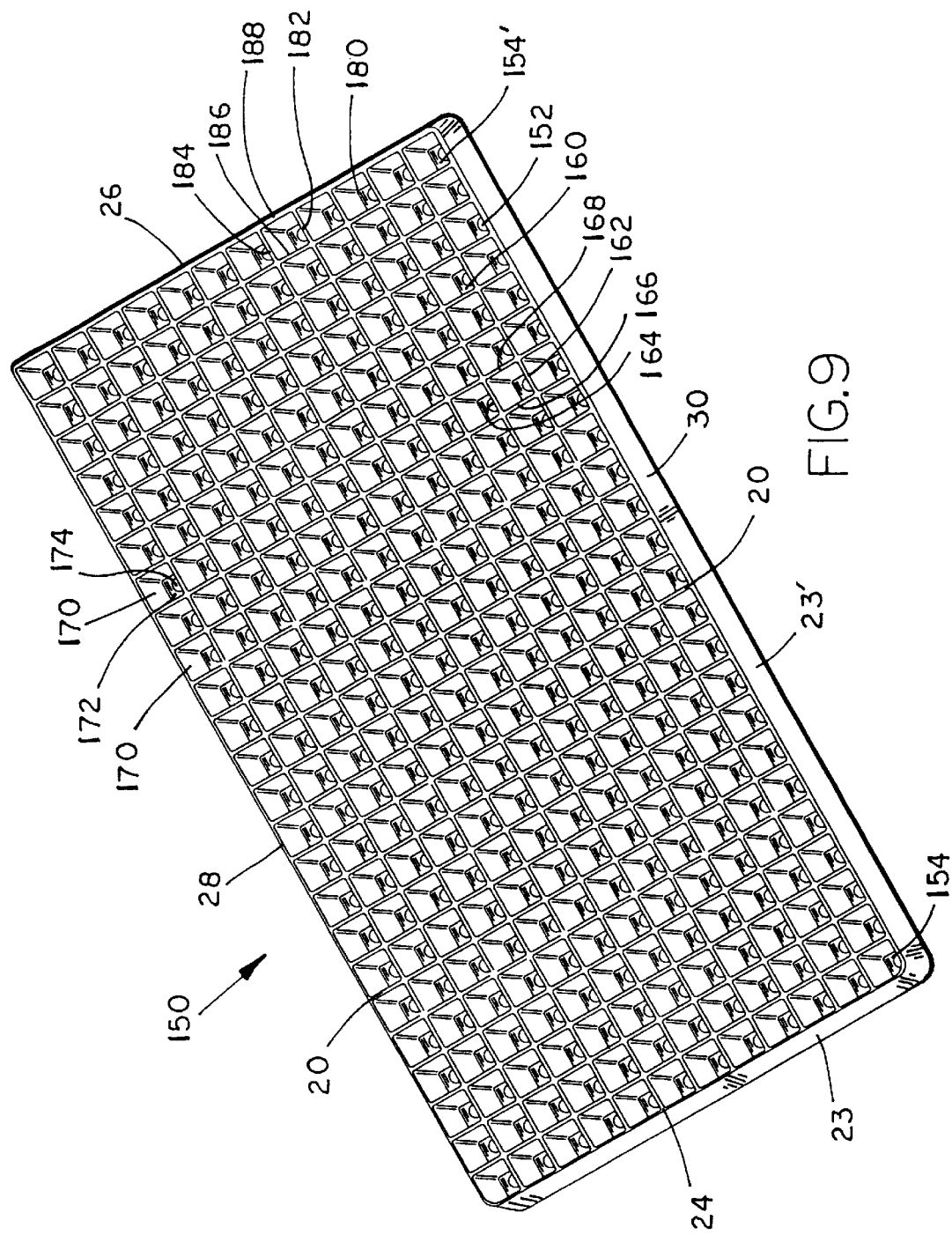
FIG. 9 is a perspective view of a plug tray according to another alternative preferred embodiment of the invention.
Figure 10:
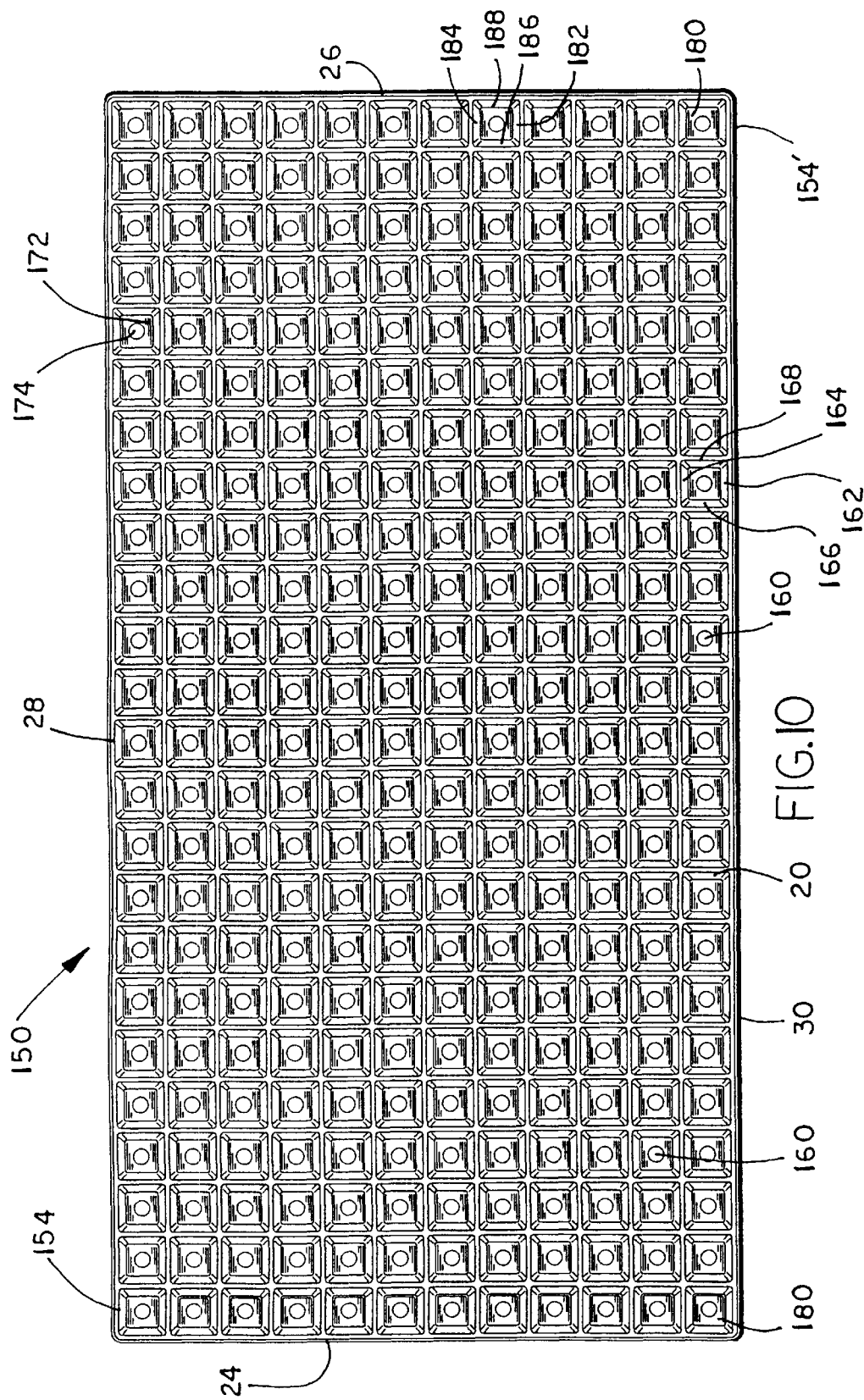
FIG. 10 is a plan view of the plug tray depicted in FIG. 9.

Referring now to FIGS. 9 through 11, a plug tray 150 includes a plurality of rows 152 of inner cells 160, placed and formed in spatial relation, and projecting a preselected distance below surface member 20. A pair of rows 154 and 154' of outer cells 180 are provided, each row being adjacent to one of ends 24 and 26, respectively. Rows 152, 154 and 154' span from side 28 to side 30. In this embodiment, each inner cell 160 includes four side top edges 162, 164, 166, and 168. Each side top edge 162, 164 is substantially parallel to opposing sides 28, 30, while each side top edge 166, 168 is substantially parallel to opposing ends 24, 26. Similarly, each outer cell 180 includes four side top edges 182, 184, 186, and 188. Side top edges 182, 184 are substantially parallel to opposing sides 28, 30, while side top edges 186, 188 are substantially parallel to opposing ends 24, 26. Each cell 160 and 180 is preferably a parallelogram, and has downwardly tapering side surfaces 170 joined to a bottom member 172 at bottom corners 173.

Each bottom member 172 is formed with a bottom aeration hole 174. Bottom aeration hole 174 is formed in bottom member 172 such that each side surface 170, at bottom corners 173, are separated from bottom aeration hole 174 by bottom member 172. Side surfaces 170 of each cell 160, 180 are completely separate such that no side surface 170 is common with a side surface 170 of an adjacent cell 160 or 180. Preferably, the length of side top edges 162, 164 is approximately equal to the length of side top edges 166, 168, thereby making inner cells 160 substantially square. Also, the length defined by side top edges 182, 184 is slightly greater than the length defined by side top edges 186, 188. Moreover, the length defined by side top edges 162, 164 is greater than the length defined by side top edges 182, 184, and the length of side top edges 166, 168 is greater than the length defined by side top edges 186, 188. Thus, each outer cell 180 is slightly smaller than each inner cell 160. The smaller size of outer cells 180 enables the center-to-center distances between outer cells 180 of adjacent plug trays 150 to substantially equal the center-to-center distance between inner cells 160, and the center-to-center distance between inner cells 160 and outer cells 180, when adjacent plug trays 150 are placed such that skirts 23 are in contact. Furthermore, it will be understood that the volume defined by inner cells 160 will be greater than the volume defined by outer cells 180.

In this embodiment, surface member 20 is defined by the interstitial space between adjacent cells 160 and 180. Absent from this embodiment are aeration apertures 42. In all other respects, plug tray 150 is structurally similar to plug trays 10, 10' and 100.

To manufacture plug tray 150, a suitable sheet of polymeric material is first loaded into a thermoforming apparatus. Thereafter, polymeric sheet is thermoformed in accordance with normal industry procedure, to produce surface member 20, cells 160, 180 and skirts 23, 23'. Thereafter, bottom aeration holes 174 are simultaneously punched or cut in a single punching operation using a punching tool having a plurality of punch projections corresponding to the number of holes. Alternatively, multi-step hole forming methods can be used, however, bottom aeration holes 174 may be formed in plug tray 150 by any method, utilizing any apparatus normally utilized in the art, capable of cutting a polymeric material. Preferably, bottom aeration holes 174 are formed by a die cutting apparatus.

The above description is considered that of the preferred embodiments only. Modifications of the invention will occur to those skilled in the art, and those who make or use the invention. Therefore, it is understood that the embodiments shown in the drawings and described above are merely for illustrative purposes and are not intended to limit the scope of the invention, which is defined by the following claims as interpreted according to the principals of patent law, including the doctrine of equivalents.

The embodiments of the invention in which an exclusive property or privilege is claimed are defined as follows:

1. A plug tray formed from a thermoformed, thin, polymeric sheet having a thickness within the range of about 0.025 to about 0.075 inches and comprising:
   a surface member having a pair of opposing ends, a pair of opposing sides, and a major axis;
   a plurality of rows of inner cells formed in said surface member, each inner cell of said plurality of rows of inner cells having a center and dimensioned to receive a charge of growing material and at least one seed, each inner cell having a fist shape, a plurality of side top edges, and a center;
   a pair of rows of outer cells formed in said surface member, each outer cell of said pair of rows of outer cells having a center, a plurality of side top edges, and dimensioned to receive a charge of growing material and at least one seed, each row of said pair of rows of outer cells positioned adjacent an end of said pair of opposing ends of said surface member, wherein each inner cell of said plurality of rows of inner cells and each outer cell of said pair of rows of outer cells is positioned at a preselected offset angle extending between said major axis which extends from one of said opposing sides to the other of said sides through said centers of said cells in any one row of inner and outer cells and a plane including a side top edge of a cell in said one row, said offset angle being between about 15° to 45°, each outer cell of said pair of rows of outer cells having a second shape, wherein said first shape is different than said second shape;
   a plurality of apertures formed in said surface member to provide aeration for plant growth, each aperture of said plurality of apertures being separated from said inner cells and said outer cells by said surface member;
   each inner cell of said plurality of inner cells having sides defining a downwardly tapered configuration, and each outer cell of said plurality of outer cells having sides defining a downwardly tapered configuration
   said surface member further comprising a skit depending from said pair of opposing sides and said pair of opposing ends, said skirt having an outer edge and being flared outwardly at a pre-selected angle to said pair of opposing ends and to said pair of opposing sides to facilitate strength and rigidity of said plug tray, said flared skirt and downwardly tapered configuration of said inner and outer cell sides cooperating to allow compact stacking of said plug tray in a vertical arrangement with others of said plug tray;
   wherein the center-to-center distance between adjacent inner cells, the center-to-center distance between adjacent outer cells, and the center-to-center distance between adjacent inner and outer cells are all substantially equal and comprise a fast distance, and the distance between the center of any one of said outer cells of said plug tray and said outer edge of said flared skirt adjacent to such outer cell taken together with the distance between the center of an adjacent outer cell of another of said plug trays and the adjacent outer edge of the flared skirt on the other plug tray being substantially equal to said first distance when the other plug tray is placed end to end with said plug tray and said flared skirt on said plug tray and the flared skirt on the other plug tray are contacting one another whereby said plug tray is useful in continuous automated planting and transplantation processes.

2. The plug tray as recited in claim 1, wherein each inner cell of said plurality of rows of inner cells has a top opening which is square in shape.

3. The plug tray as recited in claim 1, wherein said plurality of apertures further comprises a plurality of rows of apertures, each row of apertures of said plurality of rows of apertures being adjacent a row of inner cells of said plurality of rows of inner cells.

4. The plug tray as recited in claim 3, wherein said plurality of apertures are formed in said surface member such that each outer cell of said pair of rows of outer cells is adjacent to at least one aperture of said plurality of apertures.

5. The plug tray as recited in claim 3, wherein said plurality of apertures are formed in said surface member such that each outer cell of said pair of rows of outer cells is adjacent to one aperture of said plurality of apertures.

6. The plug tray as recited in claim 1, wherein said plurality of apertures are formed in said surface member such that each inner cell of sad plurality of rows of inner cells is adjacent to two apertures of said plurality of apertures.

7. The plug tray as recited in claim 1, wherein each inner cell of said plurality of inner cells and each outer cell of the pair of rows of outer cells has a first height, and said skirt has a second height, wherein said second height is less than said first height.

8. The plug tray of claim 1 wherein said sides of each of said inner cells and each of said outer cells are joined to a bottom member, each bottom member including an aeration hole for aeration of any growing material in the cell.

9. A plug tray formed from a thermoformed, thin, polymeric sheet having a thickness within the range of about 0.025 to about 0.075 inches, and comprising:

a surface member having a perimeter defined by a pair of opposing sides and a pair of opposing ends;

a plurality of rows of inner cells arranged in adjacent rows in said surface member, each inner cell of said plurality of rows of inner cells dimensioned to receive a charge of growing material and at least one seed, wherein each inner cell has a center and a substantially square slope and four sides attached to a bottom member, wherein said bottom member has a hole formed therein, wherein said hole is formed in said bottom member such that each side of said four sides is separated from said hole by said bottom member;

a plurality of apertures formed in said surface member to provide aeration for plant growth; and a pair of rows of outer cells arranged in rows in said surface member, each outer cell of said pair of rows of outer cells dimensioned to receive a charge of growing material and at least one seed, each row of said pair of rows of outer cells positioned adjacent an end of said pair of opposing ends of said surface member, each outer cell of said pair of rows of outer cells having a center and a top opening edge proximate to an end of said pair of opposing ends of said surface member, said top opening edge of each outer cell of said pair of rows of outer cells being substantially parallel to said end of said pair of opposing ends of said surface member;

said four sides of each inner cell of said plurality of rows of inner cells defining a downwardly tapered configuration, and each outer cell of said pair of rows of outer cells having sides defining a downwardly tapered configuration;

said surface member filter comprising a skirt depending from said pair of opposing sides and said pair of opposing ends, said skit having an outer edge and being flared outwardly at a pre-selected angle to said pair of opposing ends and to said pair of opposing sides to facilitate strength and rigidity of said plug tray, said flared skit and downwardly tapered configuration of said inner and outer cell sides cooperating to allow compact stacking of said plug tray in a vertical arrangement with others of said plug tray;

wherein the center-to-center distance between adjacent inner cells, the center-to-center distance between adjacent outer cells, and the center-to-center distance between adjacent inner and outer cells are all substantially equal and comprise a first distance, and the distance between the center of any one of said outer cells of said plug tray and said outer edge of said flared skirt adjacent to such outer cell taken together with the distance between the center of an adjacent outer cell of another of said plug trays and the adjacent outer edge of the flared skirt on the other plug tray being substantially equal to said fist distance when the other plug tray is placed end to end with said plug tray and said flared skirt on said plug tray and the flared skirt on the other plug tray are contacting one another whereby said plug tray is useful in continuous automated planting and transplantation processes.

10. The plug tray as recited in claim 9, wherein each side of said four sides of each inner cell is integrally attached to each adjacent side, such that said four sides form a continuous side wall periphery.

11. The plug tray as recited in claim 9, wherein said surface member has a major axis and wherein each inner cell of said plurality of rows of inner cells and each outer cell of said pair of rows of outer cells is positioned at a preselected offset angle with respect to said major axis of said surface member.

12. The plug tray as recited in claim 9, wherein said plurality of apertures further comprises a plurality of rows of apertures, each row of apertures of said plurality of rows of apertures being adjacent a row of inner cells of said plurality of rows of inner cells.

13. The plug tray as recited in claim 12, wherein said plurality of apertures are formed in said surface member such that each outer cell of said pair of rows of outer cells is adjacent to at least one aperture of said plurality of apertures.

14. The plug tray as recited in claim 9, wherein said plurality of apertures are formed in said surface member such that each inner cell of said plurality of rows of inner cells is adjacent to two apertures of said plurality of apertures.

15. The plug tray as recited in claim 14, wherein said plurality of apertures are formed in said surface member such that each outer cell of said pair of rows of outer cells is adjacent to one aperture of said plurality of apertures.

16. The plug tray as recited in claim 9, wherein said preselected angle of said skirt is between approximately 2° and 8°.

17. The plug tray as recited in claim 9, wherein said preselected angle of said skirt from each of said opposing ends is approximately 3°.

18. The plug tray as recited in claim 9, wherein said preselected angle of said skirt from each of said opposing sides is approximately 5°.

19. The plug tray of claim 9 wherein each of said outer cells has a plurality of sides joined to a bottom member, each outer cell bottom member including an aeration hole for aeration of any growing material in the cell.

20. A plug tray formed from a thermoformed, thin, polymeric sheet having a thickness within the range of about 0.025 to about 0.075 inches, and comprising:

a pair of opposing ends and opposing sides;

a plurality of rows of inner cells, each inner cell of said plurality of rows of inner cells dimensioned to receive a charge of growing material and at least one seed, each inner cell having a center and four side top edges, wherein each side top edge of said four side top edges is substantially parallel to one of said opposing sides or said opposing ends;

a pair of rows of outer cells, each row of said pair of rows of outer cells positioned adjacent an end of said pair of opposing ends, each outer cell of said pair of rows of outer cells dimensioned to receive a charge of growing material and at least one seed, each outer cell having a center and four side top edges, wherein each side top edge of said four side top edges is substantially parallel to one of said opposing sides or said opposing ends; and wherein each inner cell has a first dimension generally parallel to said opposing ends and a second dimension generally parallel to said opposing sides, wherein each outer cell has a first dimension generally parallel to said opposing ends and a second dimension generally parallel to said opposing sides, wherein said first dimension of each inner cell is greater said first dimension of each outer cell, and wherein said second dimension of each inner cell is greater than said second dimension of each outer cell;

each of said inner cells having sides defining a downwardly tapering configuration, and each of said outer cells having sides defining a downwardly tapering configuration;

a skirt depending from said pair of opposing sides of said plug tray and said pair of opposing ends of said plug tray, said slit having an outer edge and being flared outwardly at a preselected angle to said pair of opposing ends and to said pair of opposing sides to facilitate strength and rigidity of said plug tray, said flared skirt and downwardly tapered configuration of said inner and outer cell sides cooperating to allow compact stacking of said plug tray in a vertical arrangement with others of said plug tray;

wherein the center-to-center distance between adjacent inner cells, the center-to-center distance between adjacent outer cells, and the center-to-center distance between adjacent inner and outer cells are all substantially equal and comprise a first distance, and the distance between the center of any one of said outer cells of said plug tray and said outer edge of said flared skirt adjacent to such outer cell taken together with the distance between the center of an adjacent outer cell of another of said plug frays and the adjacent outer edge of the flared skirt on the other plug tray being substantially equal to said first distance when he other plug tray is placed end to end with said plug tray and said flared skirt on said plug tray and the flared skirt on the other plug tray are contacting one another whereby said plug tray is useful in continuous automated planting and transplantation processes.

21. The plug tray as recited in claim 20, wherein each inner cell defines a first volume and each outer cell defines a second volume, and wherein said first volume is greater than said second volume.

22. The plug tray as recited in claim 20, wherein said first dimension and said second dimension of each inner cell is approximately equal.

23. The plug tray as recited in claim 20, wherein said first dimension and said second dimension of each outer cell are not equal.

24. The plug tray of claim 20 wherein said sides of each of said inner cells and each of said outer cells are joined to a bottom member, each bottom member including an aeration hole for aeration of any growing material in the cell.

25. A method of forming a plug tray comprising the steps of:
providing a thin, polymeric sheet having a thickness in the range of about 0.025 to about 0.075 inches; and
thermoforming said thin, polymeric sheet into said plug tray, said plug tray including forming:
a surface member having a perimeter defined by a pair of opposing sides and a pair of opposing ends and a major axis,
a plurality of rows of inner cells in said surface member, each inner cell of said plurality of rows of inner cells being dimensioned to receive a charge of growing material and at least one seed,
a pair of rows of outer cells in said surface member with each row of outer cells positioned adjacent an end of said pair of opposing ends of said surface member,
a skirt depending from said perimeter of said surface member, said skirt being formed to angle outwardly from said perimeter to allow compact stacking of said plug tray in a vertical arrangement with others of said plug tray and to help strengthen and rigidify said plug tray;
said plug tray filer being formed with the center-to-center distance between adjacent inner sells and between adjacent inner and outer cells substantially equal to the distance between the center of any of said outer cells and the outer edge of said angled skirt adjacent to such outer cell when taken together with a similar distance between the center of an outer cell on another of said plug trays and the outer edge of the angled skirt on the other plug tray adjacent to such other outer cell when the other plug tray is placed end to end with said plug tray and said angled skirt on said plug tray and the angled skirt on the other plug tray are contacting one another;
each of said outer cells further being formed to have at least one of
a) a shape of which is different from that of said inner cells, and
b) a size which is different from that of said inner cells; such that said plug tray is useful in continuous automated planing and transplantation processes.

26. The method as recited in claim 25, wherein each cell of said plurality of rows of cells is positioned at a preselected offset angle with respect to said major axis of said surface member.

27. The method as recited in claim 25, further comprising the step of cutting a plurality of rows of apertures in said surface member, each row of said plurality of rows of apertures positioned adjacent a row of cells of said plurality of rows of cells.

28. The method as recited in claim 25, further comprising the step of cutting a plurality of apertures in said surface member such that each cell of said plurality of rows of cells is adjacent to two apertures of said plurality of apertures.

29. The method as recited in claim 25, including forming a bottom in each cell of said plurality of rows of inner and outer cells, said method further comprising the step of cutting a hole in said bottom of each cell of said plurality of rows of inner and outer cells.

30. The method as recited in claim 25, including forming each outer cell of said pair of rows of outer cells to include a top opening edge proximate to an end of said pair of opposing ends of said surface member, said top opening edge of each outer cell of said pair of rows of outer cells being substantially parallel to said end of said pair of opposing ends of said surface member.

31. The method as recited in claim 25, including forming each cell of said plurality of rows of inner and outer cells with four side top edges such that each side top edge of said four side top edges is substantially parallel to one of said opposing sides or said opposing ends.

32. A system for growing plants comprising:
at least a first plug tray and a second plug tray, each of said fist and second plug trays being formed from a thermoformed, thin, polymeric sheet having a thickness within the range of about 0.025 to about 0.075 inches, said first plug tray and said second plug tray each having a pair of opposing ends and a pair of opposing sides, wherein an end of said pair of opposing ends of said first plug tray is positioned in contact with an end of said pair of opposing ends of said second plug tray, said first plug tray and said second plug tray each including:

a surface member;

a plurality of rows of inner cells formed in said surface member, each inner cell of said plurality of rows of inner cells dimensioned to receive a charge of growing material and at least one seed, each inner cell of said plurality of rows of inner cells having a center, wherein the center-to-center distance between adjacent inner cells is substantially equal;

a plurality of apertures formed in said surface member, a pair of rows of outer cells formed in said surface member, each row of said pair of rows of outer cells positioned adjacent an end of said pair of opposing ends, each outer cell of said pair of rows of outer cells dimensioned to receive a charge of growing material and at least one seed, each inner cell and each outer cell having sides defining a downwardly tapered configuration;

said surface member further comprising a skirt depending from said pair of opposing sides and said pair of opposing ends, said skirt having an outer edge and being flared outwardly at a pre-selected angle to said pair of opposing ends and to said pair of opposing sides to facilitate strength and rigidity of said plug tray, said flared skirt and downwardly tapered configuration of said inner and outer cell sides cooperating to allow compact stacking of said plug tray in a vertical arrangement with others of said plug tray;

wherein each outer cell of said pair of rows of outer cells is formed such that the center-to-center distance between an outer cell of said first plug tray and an adjacent outer cell of said second plug tray measured across said flared skirts on said fist and second plug trays is substantially equal to said center-to-center distance between adjacent inner cells when said first plug tray and said second plug tray are positioned with said flared skirts on said ends in contact.

33. The system as recited in claim 32, wherein each inner cell of said plurality of rows of inner cells is formed having a top opening which is generally square in shape and wherein each outer cell of said pair of rows of outer cells is formed having a generally pentagonal shape.

34. The system as recited in claim 32, wherein each outer cell of said pair of rows of outer cells has a top opening edge proximate to an end of said pair of opposing ends, wherein said top opening edge is substantially parallel to said end.

35. The system as recited in claim 32, wherein said plurality of apertures further comprises a plurality of rows of apertures, each row of apertures of said plurality of rows of apertures positioned adjacent a row of inner cells of said plurality of rows of inner cells.

36. The system as recited in claim 32, wherein said plurality of apertures are formed in said surface member such that each inner cell of said plurality of inner cells is adjacent to two apertures of said plurality of apertures.

37. The system as recited in claim 36, wherein said plurality of apertures are formed in said surface member such that each outer cell of said pair of rows of outer cells is adjacent to one aperture of said plurality of apertures.

38. The system as recited in claim 32, wherein said fit formed in said first plug tray and said second plug tray each are formed with a bottom region, wherein said bottom region of said skirt formed in said first plug tray is in contact with said bottom region of said skirt formed in said second plug tray.

39. The plug tray of claim 32 wherein said sides of each of said inner cells and each of said outer cells are joined to a bottom member, each bottom member including an aeration hole for aeration of any growing material in the cell.

* * * * *

UNITED STATES PATENT AND TRADEMARK OFFICE
CERTIFICATE OF CORRECTION

PATENT NO. : 6,385,903 B1
DATED : May 14, 2002
INVENTOR(S) : Calvin K. Diller and Mark S. Lercel It is certified that error appears in the above-identified patent and that said Letters Patent is hereby corrected as shown below:

Column 6,
Lines 44 and 46, "comer" should be -- corner --

Column 8,
Line 60, "comers" should be -- corner --

Column 9,
Line 59, "fist" should be -- first --

Column 10,
Line 20, insert -- ; -- after "configuration"
Line 21, "skit" should be -- skirt --
Line 35, "fast" should be -- first --
Line 67, "sad" should be -- said --

Column 11,
Line 19, "slope" should be -- shape --
Line 44, "filter" should be -- futher --

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,385,903 B1
DATED : May 14, 2002
INVENTOR(S) : Calvin K. Diller and Mark S. Lercel It is certified that error appears in the above-identified patent and that said Letters Patent is hereby corrected as shown below:

Column 11,
Lines 46 and 50, "skit" should be -- skirt --
Line 65, "fist" should be -- first --

Column 13,
Line 5, insert
Line 15 "slit" should be -- skirt --
Line 32, "frays" should be -- trays --
Line 34, "he" should be -- the --

Column 14,
Line 11 "filer" should be -- further --
Line 12, "sells" should be -- cells --
Line 63, "fist" should be -- first --

Column 15,
Line 14, "," should be -- ; -- after "member"
Line 37, "fist" should be -- first --

Column 16,
Line 26, "fit" should be -- skirt --

Signed and Sealed this

Third Day of August, 2004

JON W. DUDAS
*Acting Director of the United States Patent and Trademark Office*